Figure 4:
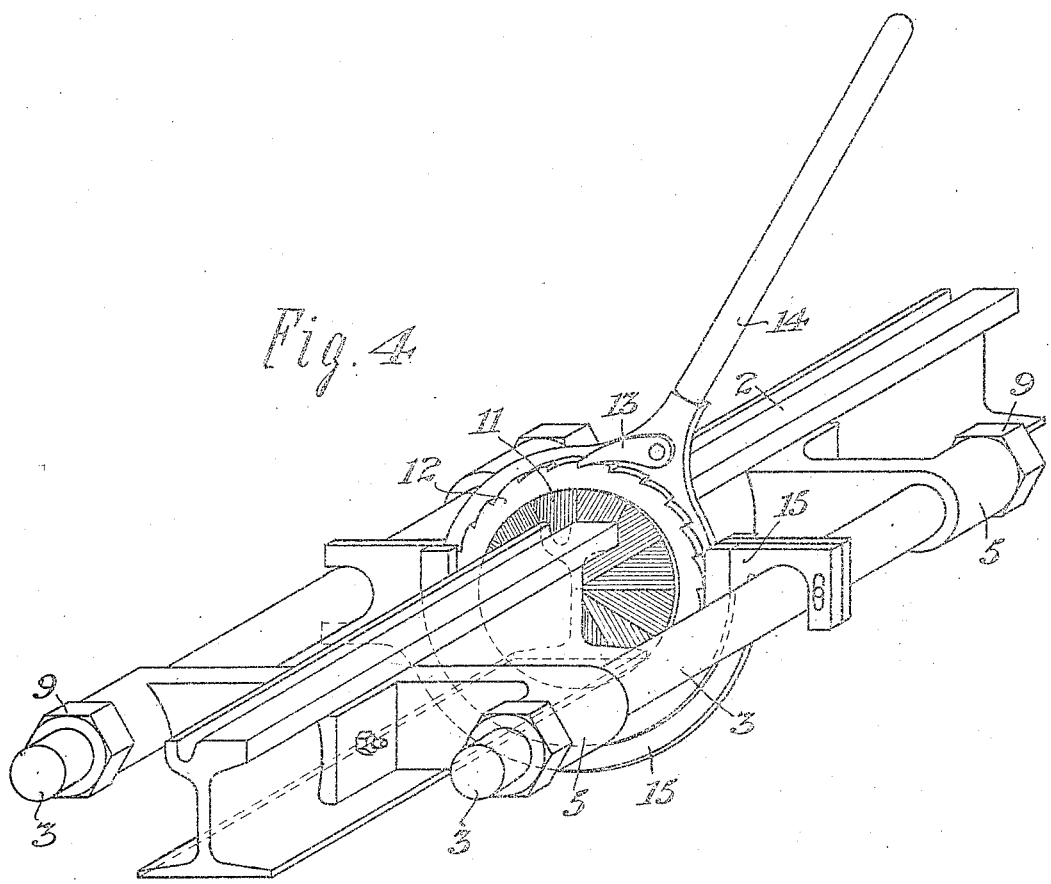

W. BREWITT.
MEANS FOR FORMING PARALLEL FACES ON THE ENDS OF RAILS, &c.
APPLICATION FILED OCT. 24, 1910.
1,075,755.
Patented Oct. 14, 1913.
3 SHEETS—SHEET 1.
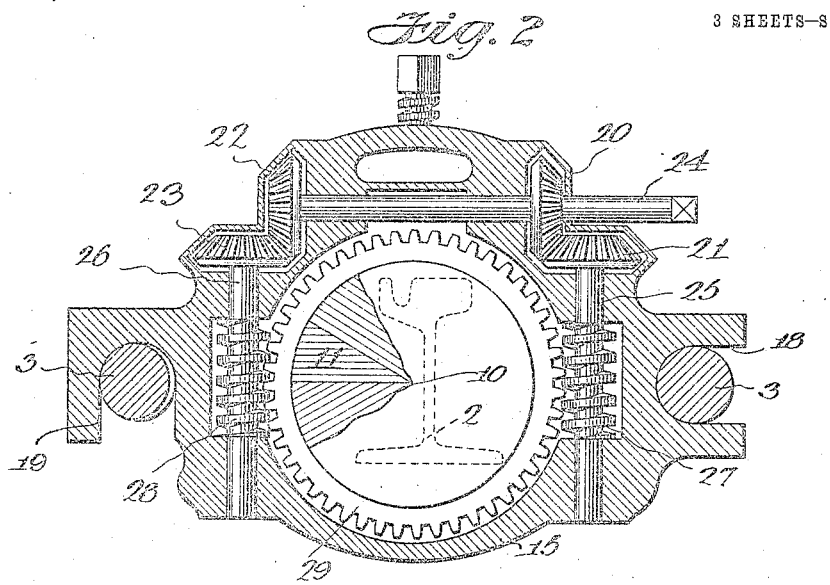
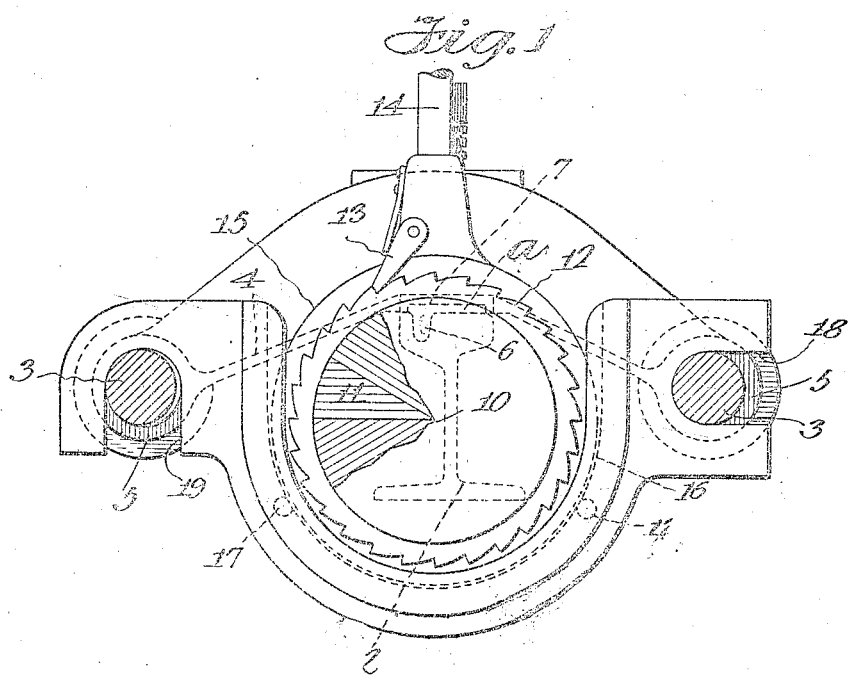
WITNESSES:
INVENTOR
Walter Brewitt
BY
his ATTORNEY

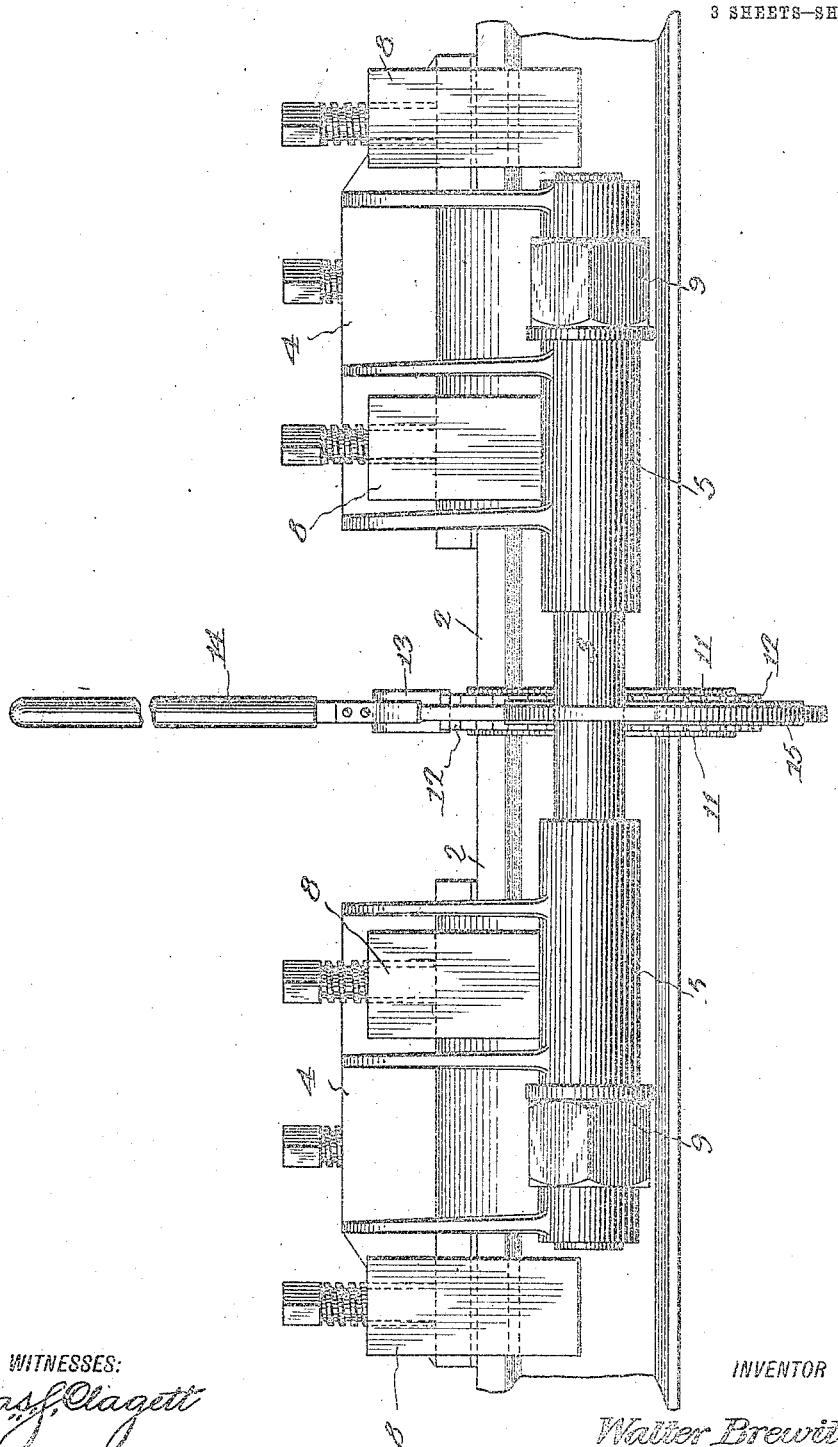

W. BREWITT.
MEANS FOR FORMING PARALLEL FACES ON THE ENDS OF RAILS, &c.
APPLICATION FILED OCT. 24, 1910.

1,075,755.

Patented Oct. 14, 1913.

UNITED STATES PATENT OFFICE.

WALTER BREWITT, OF ESSEN-ON-THE-RUHR, GERMANY, ASSIGNOR TO THE FIRM OF TH. GOLDSCHMIDT, OF ESSEN-ON-THE-RUHR, GERMANY, A FIRM COMPOSED OF KARL GOLDSCHMIDT AND HANS GOLDSCHMIDT.

MEANS FOR FORMING PARALLEL FACES ON THE ENDS OF RAILS, &c.

1,075,755.  Specification of Letters Patent.  Patented Oct. 14, 1913.

Application filed October 24, 1910. Serial No. 588,755.

*To all whom it may concern:*

Be it known that I, WALTER BREWITT, subject of the King of Prussia, German Emperor, and resident of Essen-on-the-Ruhr, in the German Empire, have invented a new and useful Means for Forming Parallel Faces on the Ends of Rails, &c., of which the following is a specification.

The present invention is in the nature of an improvement upon that shown, described and claimed in Patent No. 981,695, granted Jan. 17, 1911 to Hermann Schultz, in which is disclosed a device for forming parallel faces on the ends of rails and other articles intended to be brought together as, for example, in welding.

The principal object of this invention is to provide a device of the general type shown in the aforesaid patent in which the center of rotation of a rotary cutter having parallel lateral cutting faces for simultaneously facing the ends of two rails or other articles, is disposed at a point so near the vertical centers of the faces to be cut as to permit all portions of such surfaces to be properly faced by a light cutter of relatively small diameter, in which the cutting points near the center of rotation, that is, near the thin webs of the rails, have the least work to do and in which the principal work on the broad surface of the rail-head and on the relatively thick-metal of the rail-base, is done by the cutting points distant from such center of rotation. By locating the cutter and the work in the relative positions just described, a more efficient cutting action results and a more equal cutting action throughout the surfaces to be faced.

Another feature of the invention is the provision of means for supporting the cutter by peripheral supporting means instead of pivoting it directly upon the rails themselves. The specific features of this peripheral supporting means will be hereinafter more particularly described and claimed.

Other features of the invention not hereinbefore referred to will be hereinafter described and claimed and are illustrated in the accompanying drawings, in which, Figure 1 is a transverse section and end elevation of a hand tool illustrating one embodiment of the invention; Fig. 2 is a transverse section partly in elevation of a heavier tool having a gear-operated cutter and also embodying the invention; Fig. 3 is a side elevation of the tool shown in Fig. 1 in operative relation with a pair of rails to be faced and associated with suitable means for alining said rails and holding them in proper relation to each other; and Fig. 4 is a perspective of the hand tool of Fig. 1 in operative relation with a pair of rails held together by means of simple devices for clamping the rails together and supporting and guiding the tool.

Similar characters designate like parts in all the figures of the drawings.

Referring first to the construction illustrated in Figs. 1, 3 and 4, 2—2 designate two pieces, the ends of which are to be brought to true parallelism with each other, the work illustrated in this case consisting of a pair of railroad rails. Ordinarily suitable means is provided for holding two such articles in proper alinement with each other and for advancing one of them toward the other during the progress of the cutting action. Suitable means for this purpose is illustrated herein, particularly in Fig. 3, although it should be understood that such means may be varied greatly, that illustrated being merely a suitable type of clamping apparatus and feeding means for holding and moving the rails in the manner just mentioned. In the particular construction illustrated the clamping apparatus embodies an approximately oblong frame comprising as its main element two side pieces, preferably in the form of guide-rods, such as 3—3, and end pieces in the form of yokes, such as 4—4, spanning the rails and having at their ends bearings, such as 5—5, for receiving the guide-rods 3—3 and supporting the same. These yokes and guide-rods serve to aline the rails 2—2 and also form a support for the tool, which support, as will be obvious, is separate from the rails themselves. Said clamping apparatus in this case embodies means both for clamping the frame to the rails and for advancing the two end pieces of the frame toward each other, or withdrawing them from each other at the proper times. The means for clamping the frame to the rails comprise, in this case, a pair of combined locating and wedging devices, such as 6, here shown as shaped to fit the treads of the rails which are illustrated as of the grooved type. Each of these combined clamping and locating devices is seated in a corresponding undercut guide-way, 7, in its respective yoke 4, and with each of said devices a screw-clamp or clamps, such as 8, will usually be combined. These screw-clamps serve to engage the under sides of the heads of the rails and the upper sides of the yokes and draw the parts just described together and locate and maintain them in proper alinement. The vertical relation of the parts 6 and 4 relative to the rails may be varied in any suitable manner, as by the insertion of thin blocks or otherwise, to regulate or adjust the vertical position of the axis of the cutter with respect to the work. For the purpose of advancing the rails toward, or withdrawing them from, each other suitable means, such as the nuts 9, coöperating with corresponding screw threads, may be employed for moving the two ends of the frame and the rails clamped therein toward or away from each other along the guide-rods 3. By means of such an alining and clamping apparatus as this it will be clear that the rails will be maintained in exact alinement with each other while they are being fed during the cutting operation, and that the ends of the rails will therefore be shaped by suitable cutters to exact parallelism.

The cutting tool of the present invention differs from that shown in the patent before referred to mainly in having its center of rotation in a different relation with the faces to be shaped, and in being differently supported for operation. The axis of rotation, as will be clear by referring to Figs. 1 and 2, is located substantially at the center of gravity of the cross-section of the rail, this axis being indicated at 10. The cutter is or may be substantially the same as that shown in the aforesaid patent, and is designated generally by 11. As illustrated, it comprises two parallel, lateral cutting surfaces having a ratchet-wheel, 12, operated by a pawl and lever, 13 and 14, said lever terminating in an annular journal portion mounted on the cutter, substantially centrally thereof, and journaled circumferentially in a bearing in a frame member, such as 15, supported by the side pieces or guide-rods 3 of the rail-clamping apparatus. In order to retain the tool in the proper vertical working position the bearing is grooved as indicated at 16, so that the side walls thereof engage the sides of the ring portion of the lever and the rounded upper portion coöperates with the periphery of said annulus. Preferably, ball-bearings, such as 17, are interposed between these elements to form the direct support for said annulus and the cutter.

The frame 15 may be of any suitable type, but one substantially like that illustrated is preferred. It is shown as having at its opposite sides two recesses for receiving the guide-rods 3—3, one of these recesses being preferably horizontal and the other vertical. The former is shown at 18 and the latter at 19. This construction permits exact positioning of the tool-carrying frame in a direction transverse to the rails and prevents shifting of the axis of rotation 10. It also facilitates the application of the tool to the clamping apparatus and the work and its removal therefrom. When in operative position the cutter is turned in the manner set forth in the aforesaid patent by merely manipulating the handle 14.

The tool illustrated in Fig. 2 differs from that shown in the other views mainly in that it has gearing for actuating the cutter. In the construction illustrated this gearing comprises two pairs of bevel-gears, these gears being indicated at 20, 21, 22 and 23. The gears 20 and 22 are shown as secured to a horizontal driving spindle, 24, while the gears 21 and 23 are secured to the upper ends of a pair of vertical worm-shafts, 25 and 26, carrying worms, 27 and 28, meshing with the teeth of a large gear, 29, in fixed relation with the cutter. Power may be applied to the shaft 24 by means of a crank (not shown) or any other suitable way. All of the other parts illustrated are substantially the same as those shown in the other views and are designated by corresponding reference characters.

It will of course be obvious that any other suitable means may be employed for turning a cutter having its axis of rotation properly located in accordance with the main feature of this invention, with respect to the center of gravity of the cross-section of the work to be faced.

What I claim is:

1. A cutting device comprising a rotary disk having oppositely facing lateral cutting faces and a peripheral journal surface, means for supporting said disk peripherally for turning movement, and means for imparting driving impulse to said disk.

2. A cutting device comprising a rotary member having oppositely facing lateral cutting faces and a peripheral journal surface, means for supporting said member peripherally for turning movement, and means for imparting driving impulse to said member.

3. A cutting device comprising a rotary disk having oppositely facing lateral cutting faces and an intermediate peripheral journal surface, means for supporting said disk peripherally for turning movement, and means for imparting driving impulse to said disk.

4. A cutting device comprising a rotary member having oppositely facing lateral cutting faces and a peripheral journal surface, means for supporting said member peripherally for turning movement, and means for engaging said member circumferentially for imparting driving impulse thereto.

5. A cutting device comprising a rotary member having oppositely facing lateral cutting faces and also having a circuit of peripheral teeth, means for supporting said member peripherally for turning movement, and means for engaging said teeth and turning the cutter.

6. A cutting device comprising a rotary cutting member having oppositely facing lateral cutting faces and a periphery free from cutting faces, means for supporting said member peripherally for turning movement, and means embracing said periphery for engaging the same and imparting driving impulse thereto.

7. A cutting device comprising a rotary member having oppositely facing lateral cutting faces and a peripheral journal surface, a frame for supporting said member peripherally for turning movement, and means for imparting driving impulse to said member.

8. Means for forming parallel faces on the abutting ends of rails or other articles to be welded or otherwise joined together, comprising a rotary cutter having at its opposite sides parallel cutting faces, means for supporting said cutter in cutting position with its axis of rotation passing through the faces to be cut near the center thereof, and means for engaging the cutter and imparting driving impulse thereto.

9. Means for forming parallel faces on the abutting ends of rails or other articles of like cross-section to be welded or otherwise secured together, comprising a rotary cutter having at its opposite sides parallel cutting faces, means for supporting said cutter in cutting position with its axis of rotation passing through the articles to be cut near the common longitudinal axis thereof, and means for engaging the cutter and imparting driving impulse thereto.

10. Means for forming parallel faces on the abutting ends of rails or other articles to be welded or otherwise joined together, comprising a rotary cutter having at its opposite sides parallel cutting faces of approximately the diameter of the faces to be cut, means for supporting said cutter in cutting position with its axis of rotation passing through the faces to be cut near the centers thereof, and means for engaging the cutter and imparting driving impulse thereto.

11. Means for forming parallel faces on the abutting ends of rails to be welded together, comprising a rotary cutter having at its opposite sides parallel cutting faces, means for supporting said cutter in cutting position with its axis of rotation passing through the aforesaid faces of the rails near the vertical centers of the rails, and means for engaging the cutter and imparting driving impulse thereto.

12. Means for forming parallel faces on the abutting ends of rails or other articles to be welded or otherwise joined together, comprising a rotary cutter having at its opposite sides parallel cutting faces, means for supporting said cutter peripherally for turning movement in cutting position with its axis of rotation passing through said faces substantially midway of the height thereof, and means for engaging the cutter and imparting driving impulse thereto.

13. Means for forming parallel faces on the abutting ends of rails to be welded together, comprising a rotary cutter having at its opposite sides parallel cutting faces, means for supporting said cutter peripherally below the heads of said rails and in the zone of the webs thereof for turning movement in cutting position, and means for engaging the cutter and imparting driving impulse thereto.

14. Means for forming parallel faces on the abutting ends of rails to be welded together, comprising a rotary disk-like cutter having at its opposite sides parallel cutting faces, means for supporting said cutter in cutting position with its axis of rotation passing through the aforesaid faces of the rails below the heads of said rails, means for adjusting the vertical position of the axis of rotation of said cutter, and means for engaging the cutter and imparting driving impulse thereto.

15. Means for forming parallel faces on the abutting ends of rails or other articles to be welded or otherwise joined together, comprising a rotary cutter having at its opposite sides parallel cutting faces, a supporting frame embodying a pair of parallel rods at opposite sides of said articles, a cutter-carrier having a pair of recessed arms spanning said rods respectively the recesses of said arms being disposed substantially at a right angle to each other, and means for engaging and imparting driving impulse to said cutter.

16. Means for forming parallel faces on the abutting ends of rails to be welded together, comprising a rotary member, said member having at its opposite sides parallel cutting faces of a diameter approximately equal to the height of the rails, means for peripherally supporting said annulus for turning movement about an axis passing through the aforesaid faces of the rails near the center of gravity thereof, and means for imparting driving impulse to said annulus.

17. Means for forming parallel faces on the abutting ends of rails to be welded together, comprising a rotary cutter having at its opposite sides parallel cutting faces, and means for supporting said cutter for rotary movement about an axis passing through the aforesaid faces of the rails and lying near the vertical centers thereof.

In witness whereof I have hereunto set my hand in the presence of two witnesses.

WALTER BREWITT. [L. S.]

Witnesses:
CHAS. J. WRIGHT,
WALTER VONNEGUT.